Patented Aug. 2, 1932

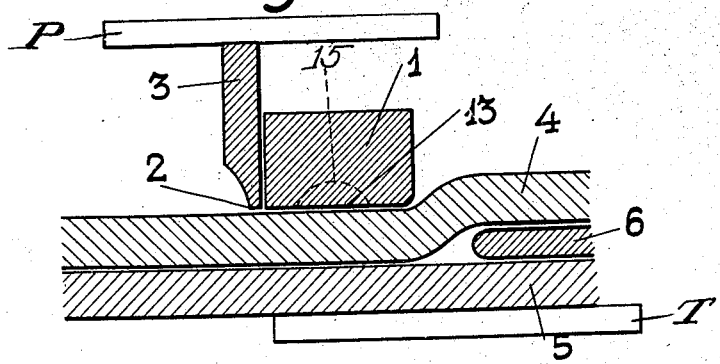
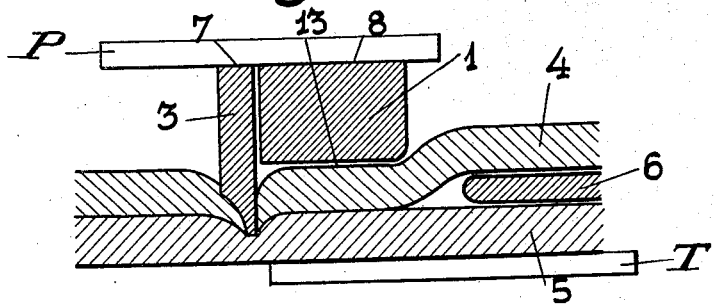
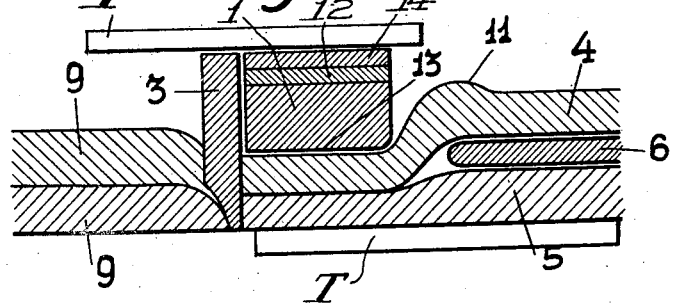

1,869,550

UNITED STATES PATENT OFFICE

ISTVÁN DOROGI AND LAJOS DOROGI, OF BUDAPEST, HUNGARY, ASSIGNORS OF ONE-HALF TO DR. DOROGI ES TARSA GUMMIGYAR R. T., OF BUDAPEST-ALBERTFALVA, HUNGARY, A LIMITED COMPANY OF HUNGARY

PRESSING AND CUTTING TEMPLATE FOR THE PRODUCTION OF ARTICLES COMPOSED OF CRUDE RUBBER SHEETS

Application filed October 11, 1928, Serial No. 311,946, and in Hungary August 17, 1928.

This invention relates to a pressing and cutting device adapted to produce articles which are made from sheets of crude rubber.

It has already been proposed to manufacture rubber articles, such as inflatable toys, bathing caps and the like, from thin, crude and therefore sticky rubber sheets, by subjecting the latter at those parts, which are to be welded together, to a pressure causing deformation, and subsequently to cut off the surplus parts of the sheets. It has also been proposed to effect the pressing which welds the parts together, and the cutting off of the surplus parts of the sheets simultaneously, by means of a tool consisting of a single piece; this tool was also capable of being united with the template which was used to prevent the inner surfaces of the sheets from sticking to each other. In making inflatable toys, such as animal figures, or the like, the cutting tools have cutting edges having curved contours which follow the outline of the figure or a portion thereof. The pressing tool has a contour which corresponds to the contour of the cutting edge.

The object of the present invention is a tool employed for carrying out the pressing and cutting-off operations simultaneously, in which the pressing tool is capable of being moved, independently of the cutting tool, in the direction of the pressing pressure. The mutual relative movement of the two tools may be secured by any desired means, e. g., means of groove guides, or simply by friction. The pressing tool and cutting tool are separate and independent of each other, and they are also separate from and independent of the parts of the press, such as the table of the press, or the like.

An embodiment of the invention, shown by way of example, is illustrated in the drawing.

Figs. 1, 2 and 3 are detail sectional views showing the various parts of the device in three different working positions.

In the initial position illustrated by Fig. 1 the pressing tool 1 and the cutting edge 2 of knife 3 rest on the sheets 4 and 5 intended to be united. The inner surfaces of these sheets are prevented from sticking to each other at the spots which are not intended to be united, for instance, by template 6. The sheets 4 and 5, together with the intermediate template, rest upon the table T of an ordinary press. As soon as the upper plate P of the press goes down, knife 3 (Fig. 2) will first penetrate into the sheets, whereas pressing tool 1 will remain behind, in substantially the original position. In accordance with the invention, the difference of height between the two tools 1 and 3 will amount to more than a single thickness, but to less than the double thickness of either sheet 4 or sheet 5. Hence, the knife will, for the present, not penetrate entirely through the sheets, but will only powerfully press one against the other and displace a part of the sheet material towards the right and towards the left side of the partial cut. As soon as the knife 3 has been depressed far enough to make its top edge 7 reach the level of the upper surface 8 of the pressing tool 1, the latter also will be operated by the full pressure of the press head, and the tool will be pressed downwards together with knife 3 until the knife-edge 2 will have entirely penetrated the sheets and will have cut-off the waste part 9 (Fig. 3). Provided that the heights of the tool are in the proportion above referred to, the sheet material under the pressing tool suffers a permanent diminution of its thickness so that the weld edge will have a thickness which is smaller than the thickness of the double sheet. If a pressure as strong as that described is exerted, a part of the material of the upper sheet 4 is permanently displaced in the form of a bulge 11.

After pressing, the manufacture of the article is completed in the usual manner.

The invention enables the pressure employed for the welding to be applied in an exactly predetermined extent, without impairing the reliability of the knife's action. The knife 3 or preferably the pressing tool 1 may be composed of several superimposed parts (e. g. 12, 14, Fig. 3) so that by employing sets of knives and pressing parts of suitable heights, varying requirements of operation, as e. g. varying thickness of sheets, or the use of softer sheet material can duly be taken into account.

The pressing surface 13 of the pressing tool 1 cannot not only be made smooth, but also grooved or fitted.

Any suitable mechanical means may be used for actuating the cutting member 3 in advance of the pressing member 1.

Having now particularly described and ascertained the nature of our said invention and in what manner the same is to be performed, we declare that what we claim is:

1. In a device adapted to cut and to press together the edges of a pair of sheets of crude rubber separated by a template, a cutting member laterally spaced from the edge of said template, a pressing member located intermediate said cutting member and the edge of the template, said pressing member being movable independently of said cutting member, said cutting member extending above said pressing member so that said cutting member can be actuated before said pressing member is actuated, said device having a table adapted to support said sheets of rubber, said device also having a movable head which is movable toward said table, so that said movable head first actuates said cutting member and then actuates said pressing member.

2. In a device adapted to cut and to press together the cut edges of a pair of sheets of crude rubber separated by a template, a cutting member spaced from the edge of said template, a pressing member located intermediate said cutting member and the edge of the template, said pressing member being movable independently of said cutting member, said cutting member extending above said pressing member so that said cutting member can be actuated before said pressing member is actuated, said cutting member extending above said pressing member for a distance which exceeds the thickness of the bottom rubber sheet and which is less than the combined thickness of both sheets, said device having a table adapted to support said sheets of rubber, said device also having a movable head which is movable toward said table, so that said movable head first actuates said cutting member and then actuates said pressing member.

3. A device adapted to cut and to press together the cut edges of a pair of sheets of crude rubber, comprising a table adapted to support said sheets of rubber, a cutting tool, a pressing tool, said pressing tool being movable wholly independently of said cutting tool, said cutting tool and said pressing tool having closely adjacent surfaces, so that said pressing tool can move with respect to the adjacent surface of said cutting tool, and means adapted to actuate said cutting tool before actuating said pressing tool.

4. A device adapted to cut and to press together the cut edges of a pair of sheets of crude rubber, comprising a table adapted to support said sheets of rubber, a cutting tool, a pressing tool, said pressing tool being movable wholly independently of said cutting tool, said cutting tool and said pressing tool having closely adjacent surfaces, so that said pressing tool can move with respect to the adjacent surface of said cutting tool, and means adapted to actuate said cutting tool before actuating said pressing tool, said pressing tool having a substantially flat pressing surface, the cutting edge of said cutting tool and the pressing surface of said pressing tool having similar curved outlines.

5. A device adapted to cut and to press together the cut edges of a pair of sheets of crude rubber, comprising a table adapted to support said sheets of rubber, a pressure head movable toward said table, a cutting tool, a pressing tool, said pressing tool being wholly separate from said cutting tool, said cutting tool and said pressing tool having closely adjacent surfaces, so that said pressing tool can glide along the adjacent surface of said cutting tool, said cutting tool extending above said pressing tool, so that the movable head first operates the cutting tool and then operates the pressing tool, the height of said cutting tool exceeding the height of said pressing tool by the predetermined thickness of the seam to be formed.

In testimony whereof we affix our signatures.

ISTVÁN DOROGI.
LAJOS DOROGI.